United States Patent [19]

Schimmel et al.

[11] 4,221,885
[45] Sep. 9, 1980

[54] ADDITION INTERPOLYMERS HAVING IMPROVED STABILITY AND TWO-PACKAGE COMPOSITIONS COMPRISING SUCH INTERPOLYMERS AND POLYEPOXIDES

[75] Inventors: Karl F. Schimmel, Verona; Roger M. Christenson, Gibsonia; Jerome A. Seiner, Pittsburgh; James A. Claar, Export, all of Pa.

[73] Assignee: PPG Industries, Inc., Pittsburgh, Pa.

[21] Appl. No.: 939,950

[22] Filed: Sep. 6, 1978

Related U.S. Application Data

[63] Continuation of Ser. No. 771,134, Feb. 23, 1977, abandoned.

[51] Int. Cl.$^2$ ................................................ C08F 8/30
[52] U.S. Cl. ............................ 525/328; 260/29.6 H; 260/29.6 TA; 260/33.2 EP; 260/33.2 R; 525/119; 525/329; 525/369; 525/375; 526/308; 526/317
[58] Field of Search ................ 526/15, 16; 525/328, 525/329

[56] References Cited

U.S. PATENT DOCUMENTS

| | | | |
|---|---|---|---|
| 3,282,879 | 11/1966 | Werner | 260/29.6 |
| 3,290,416 | 12/1966 | Christenson et al. | 260/901 |
| 3,290,417 | 12/1966 | Christenson et al. | 260/901 |
| 3,386,939 | 6/1968 | Mesec | 260/29.3 |
| 3,494,847 | 2/1970 | Yurchesen et al. | 204/181 |
| 3,538,185 | 11/1970 | Davis et al. | 260/837 |
| 3,634,372 | 1/1972 | McFadden | 260/86.1 N |
| 3,705,076 | 12/1972 | Usala | 161/189 |
| 3,719,629 | 3/1973 | Martin et al. | 260/33.2 EP |
| 3,929,743 | 12/1975 | Sramek | 260/80.8 |
| 3,945,963 | 3/1976 | Levine et al. | 260/29.6 NR |

Primary Examiner—Stanford M. Levin
Attorney, Agent, or Firm—Charles R. Wilson

[57] ABSTRACT

Amine group-containing addition interpolymers having improved stability under conditions of storage and use are prepared by interpolymerizing at least one polymerizable ethylenically unsaturated carboxylic acid monomer and at least one polymerizable ethylenically unsaturated aminolysis-resistant organic monomer to form an addition interpolymer containing carboxyl groups pendent to the polymer chain and aminolysis-resistant organic groups pendent to the polymer chain, following which a portion of the pendent carboxyl groups of the addition interpolymer are reacted with an alkylenimine to form pendent amine groups and a portion of the pendent carboxyl groups of the addition interpolymer are neutralized with a basic compound to form pendent anionic salt groups.

8 Claims, No Drawings

4,221,885

ADDITION INTERPOLYMERS HAVING IMPROVED STABILITY AND TWO-PACKAGE COMPOSITIONS COMPRISING SUCH INTERPOLYMERS AND POLYEPOXIDES

This is a continuation of application Ser. No. 771,134, filed Feb. 23, 1977, now abandoned.

BACKGROUND OF THE INVENTION

Organic solvent soluble and water-soluble or water-thinnable addition interpolymers containing pendent carboxyl groups, pendent amine groups formed by reacting a portion of the pendent carboxyl groups with an alkylenimine, and other pendent organic groups are known in the art as illustrated by U.S. Pat. Nos. 3,290,416; 3,290,417; 3,494,847; 3,719,692 and 3,945,963. While amine group-containing addition interpolymers of the type described in these patents have a number of advantageous properties, they also exhibit serious disadvantages which materially limit their usefulness.

A major disadvantage of amine group-containing addition interpolymers of the type described in these patents is their very limited storage life particularly at elevated temperature storage conditions. Thus, we have found that amine group-containing addition interpolymers of the type described in the patents are prone to gellation when stored at room temperature for time periods of less than one year (often much less) and when stored at elevated temperature (e.g., 200° F.) for time periods of from about 16 hours to about 72 hours (often from 16 to 24 hours).

The addition copolymers of U.S. Pat. No. 3,719,629, while more stable than the others, exhibit other disadvantages. The water-thinnable addition copolymers of this patent are cationic acid salts, which creates a number of problems. First, the cationic nature of the copolymer means that it cannot be readily formulated into a coating composition by blending it with the conventional anionic modifiers normally employed in coating composition. Thus, acid sensitive pigments such as the carbonates and conventional anionic pigment dispersants cannot be readily utilized. Hence, the copolymers of the patent would ordinarily require the use of nonionic modifiers which are not readily available commercially. Secondly, the fact that the addition copolymer product is an acid salt often precludes its use as a coating material for unprimed metal substrates since such acid salts usually cause flash rusting.

We have surprisingly and unexpectedly discovered that the storage stability problems encountered in addition interpolymers containing pendent carboxyl groups, pendent amine groups and other pendent organic groups (i.e., groups other than the carboxyl and amine groups) are related to the specific nature of the other organic groups included in the interpolymer. Thus, addition interpolymers containing pendent carboxyl groups, pendent amine groups and pendent organic groups formed from conventionally utilized ethylenically unsaturated monomers such as ethyl acrylate and methyl methacrylate have been found to be subject to gellation particularly at elevated temperatures (i.e., 200° F.) whereas other addition interpolymers, similar except that the other pendent organic groups are formed from certain ethylenically unsaturated organic monomers such as isobutyl methacrylate, styrene and certain others (described in detail below), are not subject to gellation under the same conditions.

It has been further found that the storage stability problems involved in such amine group-containing interpolymers are at least to a major extent caused by internal aminolysis reactions. Aminolysis occurs as the result of a reaction between a primary or secondary amine group and an ester group thereby resulting in the formation of an amide. In the case of amine group-containing addition interpolymers of the type described in the above-mentioned prior art patents, it is believed that the aminolysis reaction occurs between the pendent amine groups formed by imination of pendent carboxyl groups and pendent ester groups formed from, for example, the esters of acrylic and methacrylic acid referred to as "soft monomers" in U.S. Pat. No. 3,929,743. The aminolysis reaction in such interpolymers is believed to proceed by a mechanism in which the pendent amine groups of one polymer chain react with the pendent ester groups of another polymer chain resulting in the formation of an amide and causing crosslinking between the polymer chains. This, in turn, leads to an increase in molecular weight of the copolymer and eventual gellation.

We have now found that the storage stability of amine group-containing interpolymers can be greatly improved by incorporating certain aminolysis-resistant organic monomers (described below) into such interpolymers.

SUMMARY OF THE INVENTION

In accordance with the present invention, amine group-containing addition interpolymers having improved stability under conditions of storage and use as well as other desirable properties are prepared by interpolymerizing at least one polymerizable ethylenically unsaturated carboxylic acid monomer and at least one polymerizable ethylenically unsaturated aminolysis-resistant organic monomer to form an addition interpolymer containing carboxyl groups pendent to the polymer chain and aminolysis-resistant organic groups pendent to the polymer chain, following which a portion of the pendent carboxyl groups of the interpolymer are reacted with an alkylenimine to form pendent amine groups and a portion of the pendent carboxyl groups are neutralized with a basic compound to form pendent anionic salt groups.

The resultant addition interpolymer contains pendent anionic salt groups, pendent carboxyl groups, pendent amine groups and pendent aminolysis-resistant organic groups, and usually can be reduced or thinned with organic solvents, water or a mixture thereof. These interpolymers can be utilized as pigment grinding vehicles or they can be formulated with conventional additives to form useful coating compositions, but a preferred use is in combination with a polyepoxide to provide a two-package polymeric composition in which the addition interpolymer and the polyepoxide, upon admixing, cocure to a hard, solvent-resistant crosslinked polymer. Such two-package compositions can be used in moldings, castings etc. but are advantageously utilized as coating compositions which when applied as a film cure at ambient temperatures to a hard, stain-resistant coating.

DETAILED DESCRIPTION OF THE INVENTION

The amine group-containing addition interpolymers of the invention are prepared by interpolymerizing at least one polymerizable ethylenically unsaturated carboxylic acid monomer and at least one polymerizable ethylenically unsaturated aminolysis-resistant organic monomer to form an addition interpolymer containing carboxyl groups pendent to the polymer chain and aminolysis-resistant organic groups pendent to the polymer chain, following which a portion of the pendent carboxyl groups of the interpolymer are reacted with an alkylenimine to form pendent amine groups and a portion of the pendent carboxyl groups of the interpolymer are neutralized with a basic compound to form pendent salt groups.

The term "iminate" as employed throughout this specification and claims means to react an imine, i.e., an alkylenimine or substituted alkylenimine with a carboxyl group. Thus, an iminated interpolymer refers to an interpolymer in which the carboxyl groups thereof have been reacted or partially reacted with an imine. In addition, the term "imination" refers to the process of reacting an interpolymer containing carboxyl groups with an imine.

The term "aminolysis-resistant" as employed throughout this specification and claims refers to organic groups which resist or impede the formation of amide groups.

Polymerizable ethylenically unsaturated carboxylic acids which may be employed in forming the interpolymer include alpha, beta-ethylenically unsaturated monocarboxylic acids such as acrylic acid, methacrylic acid, cinnamic acid, and the like; unsaturated dicarboxylic acids such as meleic acid, fumaric acid, itaconic acid and the like; and half esters of unsaturated dicarboxylic acids such as t-butyl hydrogen maleate, isopropyl hydrogen fumarate and the like. It should be noted that when acids are referred to above, the anhydrides of such acids, where they exist, may also be utilized. In addition, mixtures of the foregoing acids (or anhydrides) may be employed. The preferred ethylenically unsaturated carboxylic acids herein are the alpha, beta-ethylenically unsaturated monocarboxylic acids and of these acrylic and methacrylic acids are especially preferred.

Polymerizable ethylenically unsaturated aminolysis-resistant organic monomers which can be employed in forming the interpolymer include certain monoolefinic and diolefinic hydrocarbons, unsaturated carboxylic acid amides (substituted or unsubstituted), unsaturated organonitriles and certain esters of alpha, alkyl-substituted carboxylic acids. Mixtures of such aminolysis-resistant organic monomers can also be utilized. The preferred aminolysis-resistant organic monomers are certain esters of alpha, alkyl-substituted carboxylic acids.

Aminolysis-resistant monoolefinic and diolefinic hydrocarbon monomers, which can be employed include styrene, alpha-methyl styrene, the halo-substituted styrenes, vinyl toluene, vinyl naphthalene, allyl alcohol, butadiene, isoprene and similar compounds. The preferred aminolysis-resistant hydrocarbon monomers are the vinyl aromatic hydrocarbons and of these, styrene, alpha-methylstyrene and vinyl toluene are especially preferred.

Aminolysis-resistant unsaturated carboxylic acid amides which can be employed include both unsubstituted and substituted amides. Thus, there can be employed unsubstituted amides such as acrylamide, methacrylamide, crotonamide and the like; N-alkoxyalkyl-substituted amides such as N-(methoxymethyl) acrylamide, N-(propoxymethyl) acrylamide, N-(isopropoxymethyl) acrylamide, N-(butoxymethyl) acrylamide, N-(butoxymethyl) methacrylamide and the like; and methylolated amides such as N-methylolacrylamide and the like. Mixtures of such amides may also be utilized. The preferred aminolysis-resistant amides are the N-alkoxyalkyl-substituted amides and of these, N-(butoxymethyl) acrylamide is especially preferred.

Still other aminolysis-resistant monomers which can be useful include unsaturated organonitriles such as acrylonitrile, methacrylonitrile and the like.

As indicated above, the preferred ethylenically unsaturated aminolysis-resistant organic monomers for use in forming the interpolymers of this invention are certain esters of alpha, alkyl-substituted carboxylic acids. These aminolysis-resistant esters include ethyl methacrylate, propyl methacrylate, butyl methacrylate and the like; preferred are branched chain and alicyclic esters of methacrylic acid, such as isobutyl methacrylate, tertiary butyl methacrylate, isobornyl methacrylate and cyclohexyl methacrylate. Mixtures of such monomers can also be utilized. An especially preferred aminolysis-resistant ester is isobutyl methacrylate.

An unexpected finding of this invention in view of the foregoing is that methyl methacrylate is not entirely aminolysis-resistant. Thus, it has been found that interpolymers derived from an unsaturated carboxylic acid and methyl methacrylate are subject to question when stored at elevated temperature. It has been further found, however, that appreciable amounts of methyl methacrylate can be used in combination with aminolysis-resistant monomers to provide iminated interpolymers having acceptable storage stability. Thus, methyl methacrylate can be used in combination with aminolysis-resistant monomers at levels up to about 50 percent by weight based on the combined weight of the aminolysis-resistant monomer and methyl methacrylate (see Examples 24–31).

The addition interpolymer containing pendent carboxyl groups and pendent aminolysis-resistant organic groups can be prepared by interpolymerizing from about 5 to about 60, preferably from 10 to 50, percent by weight of such ethylenically unsaturated carboxylic acid monomers and from about 40 to about 95, preferably from 50 to 90, percent by weight of such ethylenically unsaturated aminolysis-resistant organic monomers.

In some instances, minor proportions of nonaminolysis-resistant organic groups may be included in the addition interpolymers herein. This can be accomplished by including nonaminolysis-resistant monomers in the polymerization mixture. Thus, nonaminolysis-resistant esters of acrylic or methacrylic acids such as, for example, methyl acrylate, ethyl acrylate, propyl acrylate, isopropyl acrylate, butyl acrylate, methyl methacrylate and the like may be utilized in certain cases. However, the amounts of such nonaminolysis-resistant compounds which can be included in the interpolymers herein depends upon the specific monomers used, but should preferably be limited to 10 percent or less (based on polymer solids) of the alkyl acrylate esters. As indicated above, higher levels of methyl methacrylate may be employed.

The addition interpolymer containing carboxyl groups pendent to the polymer chain and aminolysis-resistant organic groups pendent to the polymer chain is prepared by interpolymerizing the polymerizable ethylenically unsaturated carboxylic acid and aminolysis-resistant organic monomers utilizing conventional vinyl addition solution polymerization techniques and procedures. Thus, the monomer mixture is ordinarily polymerized in an organic solvent or organic solvent solution in which the monomers are soluble and in the presence of a suitable catalyst, usually under controlled elevated temperatures with agitation until the polymerization reaction is complete. Various modifications commonly practiced in solution polymerization reactions such as stepwise addition of the monomer mixture during polymerization, incremental addition of catalyst, polymerization under an inert atmosphere, continuous or batch polymerization and the like may be employed. The details of such polymerizations are well known and need not be discussed in detail herein.

In polymerizing the monomers, virtually any of the organic solvents heretofore employed in preparing acrylic interpolymers may be utilized. Thus, alcohols such as propanol, butanol, or other lower alkanols; ketones such as methyl ethyl ketone, methyl n-butyl ketone, and the like, and aromatic hydrocarbons such as xylene, toluene and the like as well as mixtures of such solvents may be employed. If it is desired to prepare an ultimate interpolymer product which is to be dissolved in or thinned with water, it is often preferred to employ water-soluble or water-miscible organic solvents in the polymerization reaction. Suitable solvents of this type include ether type alcohols, such as, for example, ethylene glycol monobutyl ether, ethylene glycol monoethyl ether, diethylene glycol monoethyl ether, propylene glycol monomethyl ether, dipropylene glycol monomethyl ether, and the like; and lower alkanols having 2 to 4 carbon atoms such as ethanol, propanol, isopropanol, butanol, and the like or mixtures of these solvents. Mixtures of the above water-soluble or water-miscible organic solvents and water can also be advantageously used as the solvent medium in the polymerization reaction.

The addition interpolymer is ordinarily formed by interpolymerizing the acid monomer and aminolysis-resistant organic monomer in the presence of a vinyl polymerization catalyst. The preferred catalysts are azo compounds, such as, for example, alpha, alpha' azobisisobutyronitrile; peroxides such as benzoyl peroxide and cumene hydroxy peroxide, tertiary butyl perbenzoate, and tertiary butyl peracetate. Other useful catalysts include tertiary butyl pivalate, isopropyl percarbonate, butyl peroxy isopropyl carbonate and similar compounds. The quantity of catalyst employed may be varied considerably, however, in most instances, it is desirable to utilize from about 0.1 to about 8.0 percent by weight based on monomer solids.

If interpolymers of relatively low molecular weight are desired, a chain modifying agent or chain transfer agent is ordinarily added to the polymerization mixtures. The mercaptans such as dodecyl mercaptan, tertiary dodecyl mercaptan, octyl mercaptan, hexyl mercaptan, and the like, are conventionally used for this purpose. In addition, mercaptoesters such as isooctyl thioglycolate can advantageously be used. Other chain transfer agents which may be employed in some instances include cyclopentadiene, allyl carbamate, alpha-methyl styrene, alpha-methyl styrene dimers, and the like.

In the polymerization of the monomers, the polymerization temperature can range from about 25° C. to about 280° C., preferably 90° C. to 150° C. The specific temperature employed can vary considerably depending on the specific monomers employed, the use of catalysts and other conditions.

The amine group-containing addition interpolymers of the invention are then prepared by reacting the addition interpolymer containing pendent carboxyl groups and pendent aminolysis resistant organic groups with an alkylenimine or substituted alkylenimine in sufficient amount to iminate a portion of the pendent carboxyl groups to form pendent amine (or amino-ester) groups and a portion of the pendent carboxyl groups of the interpolymer are neutralized with a basic compound to form pendent anionic salt groups. By "anionic salt groups" are meant salt groups formed by neutralizing carboxyl groups on the interpolymer with a base.

The specific order of reaction as between imination and neutralization can be an important factor. The neutralization reaction with the basic compound is sometimes carried out after the imination but in certain preferred cases may be partly or wholly carried out prior to imination or simultaneously therewith. Moreover, as further discussed below, it is often preferred to conduct the neutralization in stages.

Alkyleneimines (which term includes substituted alkylenimines) which may be employed in the imination reaction include imines such as those of the formula:

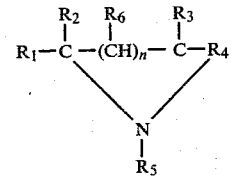

where $R_1$, $R_2$, $R_3$, $R_4$ and $R_5$ are each hydrogen; alkyl, such as methyl, ethyl, propyl, or the like, having for example, up to about 20 carbon atoms; aryl such as phenyl or the like; alkaryl, such as tolyl, sylyl or the like; or aralkyl, such as benzyl, phenethyl, or the like. $R_6$ in the formula above is hydrogen or a lower alkyl radical, usually having not more than about 6 carbon atoms and n is an integer from 0 to 1, preferably 0. Substituted radicals of the classes indicated are included where the substituent groups do not adversely affect the basic nature of the imine in the reaction. Such substituents may include groups such as cyano, halo, amino, hydroxy, alkoxy and carbalkoxy. The substituted groups may thus be cyanoalkyl, haloalkyl, aminoalkyl, hydroxyalkyl, alkoxyalkyl, carbalkoxyalkyl and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkylenimines (whether or not within the above formula) does not depend upon the particular nature of any of the substituents, but rather the imine linkage.

Illustrative examples of suitable alkylenimines (i.e., aziridines) falling within the scope of the above formula include ethylenimine (aziridine), 1,2-propylenimine(2-methyl aziridine), 1,3-propylenimine (azetidine), 1,2-dodecylenimine(2-decyl aziridine), 1,1-dimethyl ethylenimine (2,2-dimethyl aziridine), phenyl ethylenimine (2-phenyl aziridine), tolyl ethylenimine (2-(4-methylphenyl)aziridine), benzyl ethylenimine (2-phenylmethyl aziridine), 1,2-diphenyl ethylenimine (2,3-diphenyl aziridine), hydroxyethyl ethylenimine (2-(2-hydroxyethyl)aziridine), aminoethyl ethylenimine (2-(2-aminoethyl)aziridine), 2-methyl propylenimine (2-methyl aziridine), 3-chloropropyl ethylenimine (2-(3-chloropropyl)aziridine), p-chlorophenyl ethylenimine (2-(4-chlorophenyl)aziridine), methoxyethyl ethylenimine (2-(2-methoxyethyl) aziridine), dodecyl aziridinyl formate (dodecyl 1-aziridinyl carboxylate), N-ethyl ethylenimine (1-ethyl aziridine), N-butyl ethylenimine (1-butyl aziridine), N-(2-hydroxyethyl)ethylenimine (1-(2-hydroxyethyl)aziridine) and the like.

Because of their availability and because they have been found to be among the most effective, the preferred imines are alkylenimines having 2 to 4 carbon atoms, and especially ethylenimine, 1,2-propylenimine and N-hydroxyethyl ethylenimine.

The amounts of alkylenimine employed in the imination reaction can be varied considerably depending on desired properties and the proportion of acid monomer moities in the addition interpolymer. Sufficient carboxyl groups should remain after imination to permit the desired level of neutralization. In general, an amount of alkylenimine sufficient to iminate from about 5 mole percent to about 95 mole percent of the carboxylic acid groups of the interpolymer may be employed. However, in the event that it is desired to employ the interpolymer in coating formulations, it is preferred to iminate from about 15 mole percent to about 50 mole percent of the carboxylic acid groups.

As mentioned heretofore, in forming the finished addition interpolymers of the invention, a portion of the pendent carboxyl groups of the interpolymer are neutralized with a basic compound. Various basic compounds including virtually any of the bases utilized heretofore in aqueous polymeric systems may be employed for that purpose. Inorganic bases such as the alkali metal hydroxides and organic bases such as amines are preferred. Illustrative of alkali metal hydroxides which may be utilized are potassium hydroxide, sodium hydroxide and the like. Illustrative of amines which may be utilized are ammonia, ethylamine, butylamine, dimethylamine, cyclohexylamine, morpholine, monoethanolamine, dimethylethanolamine, and the like. A preferred amine is dimethylethanolamine.

The amount of basic compound employed for neutralization purposes may vary considerably depending upon factors such as the amount of acid included in the interpolymer, the type of base utilized, the identity and amount of alkylenimine used and so forth. The specific amount and type of base utilized is selected such that after neutralization, the product has the desired viscosity, solubility and other characteristics. Usually the level of neutralization is such that the addition interpolymer salt product has a pH of greater than about 6 and, preferably, greater than 7.0 in the presence of water.

As mentioned above, sometimes the imination reaction precedes the neutralization step, i.e., the interpolymer is first reacted with an alkylenimine to iminate a portion of the carboxyl groups and then a portion of the remaining carboxyl groups are neutralized with the basic compound. However, it is often advantageous and in some instances preferred to conduct the neutralization in more than one stage. Thus, more efficient processing is often achieved by partially neutralizing the pendent carboxyl groups of the interpolymer with a base prior to the imination step and then completing the remainder of the neutralization procedure after the imination step.

As mentioned above, the amine group-containing addition interpolymer of this invention can be utilized as pigment grinding vehicles or they can be formulated with conventional additives to form useful coating compositions. Conventional additives which may be employed in formulating coating compositions with these interpolymers include pigments, dyes, fillers, plasticizers, antioxidants, flow control agents and similar coating formulating additives. In the preferred manner of using these interpolymers, they are combined with a polyepoxide in a two-package composition useful as coating compositions, or for molding, casting etc.

A wide variety of polyepoxides may be utilized in these compositions, but in order to provide the cured products desired, the polyepoxide should have a 1,2-epoxy equivalence greater than 1.0, that is, in which the average number of 1,2-epoxy groups per molecule is greater than 1. The polyepoxide is preferably of low molecular weight, i.e., below about 4000. The polyepoxide can be any of the well-known epoxides such as, for example, those described in U.S. Pat. Nos. 2,467,171; 2,615,007; 2,716,123; 3,030,336; 3,053,855 and 3,075,999. A preferred class of polyepoxides are the polyglycidyl ethers of polyphenols, such as Bisphenol A, produced, for example, by etherification of a polyphenol with epichlorohydrin or dichlorohydrin in the presence of an alkali. The phenolic compound may be bis(4-hydroxyphenol)-2,2-propane, 4,4'-dihydroxybenzophenone, bis(4-hydroxyphenyl)1,1-ethane, bis(4-hydroxyphenyl)1,1-isobutane; bis(4-hydroxy-tertiarybutylphenyl)2,2-propane, bis(2-hydroxynaphthyl)methane, 1,5-dihydroxynaphthalene, or the like. Another useful class of polyepoxides are produced similarly from Novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid and the like. Examples are diglycidyl adipate and diglycidyl phthalate.

In addition, polyepoxides derived from the epoxidation of an olefinically unsaturated alicyclic compound may also be employed. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well known in the art.

Another class of polyepoxides which may be employed are those containing oxyalkylene groups in the epoxy molecule. Polyepoxides containing oxyalkylene groups can be produced by reacting some of the epoxy groups of a polyepoxide, such as the polyepoxides mentioned above, with a monohydric alcohol containing oxyalkylene groups.

Other epoxy-containing compounds and resins which may be employed include nitrogenous diepoxides such as disclosed in U.S. Pat. No. 3,365,471; epoxy resins from 1,1-methylene bis(5-substituted hydantoin), U.S. Patent No. 3,391,097; bis-imide containing diepoxides, U.S. Pat. No. 3,450,711; heterocyclic N,N'-diglycidyl compounds, U.S. Pat. No. 3,503,979; amino epoxyphosphonates, British Pat. No. 1,172,916; 1,3,5-triglycidyl isocyanurates, and the like.

The amounts of polyepoxide included in the compositions of the invention should be sufficient to provide a crosslinked product upon interreaction with the addition interpolymer but may vary considerably depending upon desired properties. Usually from about 5 to about 95 percent by weight of the polyepoxide based upon the combined weight solids of the addition interpolymer and polyepoxide may be employed, with a preferred amount being from about 25 to about 75 percent by weight.

The following examples are submitted for the purpose of further illustrating the nature of the present invention and should not be construed as a limitation upon the scope thereof. Unless otherwise indicated, all parts and percentages in the examples are by weight.

The following examples (i.e., A-E) illustrate the preparation of water-thinnable and organic solvent thinnable nonaminolysis-resistant interpolymers containing pendent carboxyl groups, pendent salt groups, pendent amine groups and pendent organic groups all or a major proportion of which are not resistant to aminolysis. These examples were prepared for the purpose of comparing the elevated temperature storage stability of these nonaminolysis-resistant interpolymers with the elevated temperature storage stability of aminolysis-resistant interpolymers of the invention (see comparative Examples 7-13 and 14-17).

EXAMPLE A

Into a reactor equipped with a stirrer, thermometer, nitrogen inlet, dropping funnel and a condenser fitted with a water trap was charged 270.2 grams of propylene glycol monomethyl ether. The contents of the reactor were heated to 120° C. and a mixture consisting of 288.6 grams of ethyl acrylate, 123.7 grams of methacrylic acid, 12.4 grams of isooctyl thioglycolate, and 23.5 grams of tertiary-butyl peracetate was added over a 2 hour period and the reaction mixture then held for 1 hour. (Based on monomer solids, the monomer charge consisted of 70 percent ethyl acrylate and 30 percent methacrylic acid.) After this 1 hour hold period, 2.4 grams of tertiary-butyl peracetate and 2.1 grams of propylene glycol monomethyl ether were added to the reactor over a 30 minute period and the mixture was then held for 1 hour. Then 134.9 grams of propylene glycol monomethyl ether were added to the reactor over 30 minutes and the contents of the reactor were then cooled to about 60° C. After cooling, 24.6 grams of propylenimine were added and the mixture was held for 2 hours. Following this period, 117.8 grams of diethylethanolamine were added to the reactor.

The resultant addition interpolymer had the following properties:

| | |
|---|---|
| Solids Content at 150° C. | 48.6 percent |
| Gardner-Holdt Viscosity | $Z_1$–$Z_2$ |
| Gardner Color | 5 |

The addition interpolymer of this example is water-thinnable and can also be thinned with an organic solvent such as, for example, ethylene glycol monoethyl ether.

EXAMPLE B

Into a reactor equipped as in Example A was charged 270.2 grams of propylene glycol monomethyl ether. The contents of the reactor were heated to 120° C. and a mixture consisting of 288.6 grams of methyl methacrylate, 123.7 grams of methacrylic acid, 12.4 grams of isooctyl thioglycolate and 23.5 grams of tertiary-butyl peracetate was added over a 2 hour period while holding temperature at 120° C. (Based on monomer solids, the monomer charge consists of 70 percent methyl methacrylate and 30 percent methacrylic acid.) The contents of the flask were then held at this temperature for 1 hour. Following this period, 2.4 grams of tertiary-butyl peracetate and 2.1 grams of propylene glycol monomethyl ether were added to the reactor over a 30 minute period and the reaction mixture was then held for 1 hour. Then, an additional 134.9 grams of propylene glycol monoethyl ether was added over a 30 minute period and the contents of the reactor were then cooled to 60° C. After cooling, 24.6 grams of propylenimine was added to the reactor and the mixture held for 2 hours. Following this period, 117.8 grams of diethylethanolamine were added.

The resultant addition interpolymer had the following properties:

| | |
|---|---|
| Solids Content at 150° C. | 56.5 percent |
| Gardner-Holdt Viscosity | $Z_9$–$Z_{10}$ |

The addition interpolymer of this example is water-thinnable and can also be thinned with an organic solvent such as, for example, ethylene glycol monoethyl ether.

EXAMPLE C

Into a reactor equipped as in Example A was charged 270.2 grams of propylene glycol monomethyl ether. The contents of the flask were heated to 120° C. and a solution consisting of 288.6 grams of 2-ethylhexyl acrylate, 123.7 grams of methacrylic acid, 12.4 grams of isooctyl thioglycolate, 23.5 grams of tertiary-butyl peracetate and 90.0 grams of propylene glycol monomethyl ether was added over a 2 hour period and the reaction mixture then held for 1 hour. (Based on monomer solids, the monomer charge consisted of 70 percent 2-ethylhexyl acrylate and 30 percent methacrylate acid.) After this 1 hour hold period, 2.4 grams of tertiary-butyl peracetate and 12.1 grams of propylene glycol monomethyl were added to the reactor over a period of 30 minutes and the mixture was then held for 1 hour and cooled. After cooling, 24.6 grams of propylenimine were added to the reactor and the mixture held for 3 hours. Following this 3 hour hold period, 102.0 grams of diethylethanolamine were added.

The resultant addition interpolymer had the following properties:

| | |
|---|---|
| Solids Content at 150° C. | 47.4 percent |
| Gardner-Holdt Viscosity | T–U |
| Gardner Color | 6 |

The addition interpolymer of this example is thinnable with water and also can be thinned with an organic solvent such as ethylene glycol monoethyl ether.

EXAMPLES D-E

In these examples, a nonaminolysis-resistant addition interpolymer was prepared and then thinned with an organic solvent (Example D) and water (Example E), respectively. The nonaminolysis-resistant addition interpolymer was prepared in the following manner:

Into a reactor equipped as in Example A was charged 800.0 grams of ethylene glycol monoethyl ether (hereinafter ethyl Cellosolve). The contents of the reactor were heated to reflux and then a mixture consisting of 156.9 grams of styrene, 235.0 grams of methyl methacrylate, 156.9 grams of ethyl acrylate, 235.4 grams of methacrylic acid, 15.7 grams of tertiary dodecyl mercaptan, 100.0 grams of ethyl Cellosolve and 12.0 grams of benzoyl peroxide was charged to the reactor over a period of approximately 2.5 hours. (Based on monomer solids, the monomer charge consists of 20 percent styrene, 30.0 percent methyl methacrylate, 20.0 percent ethyl acrylate, and 30.0 percent methacrylic acid.) The reaction mixture was then held for 1 hour at reflux. Following the hold period, 3.0 grams of benzoyl peroxide and 100.0 grams of ethyl Cellosolve were added to the reactor over a period of about 30 minutes and the reaction mixture then held for 1 hour at reflux. The reaction mixture was then cooled to about 25° C. and 93.9 grams of propylenimine were added to the reactor.

An exotherm was noted during the addition of propylenimine and the temperature was held at between 45°–55° C. with cooling. After the addition of propylenimine was completed, the reaction mixture was held for 1 hour at 55°–60° C. Following this hold period, 90.8 grams of dimethylethanolamine were added to the reactor and the temperature held at 50°–55° C. for about 30 minutes.

The resultant addition interpolymer product had the following properties:

| | |
|---|---|
| Solids Content at 150° C. | 47.0 percent |
| Gardner-Holdt Viscosity | $Z_7$ |
| Gardner Color | 2+ |

A portion of the above addition interpolymer was then thinned with ethyl Cellosolve to produce an addition interpolymer product having a solids content at 150° C. of 35.3 percent and a Gardner-Holdt viscosity of U+ (Example D).

An additional portion of the above addition interpolymer was then thinned with water to produce an addition interpolymer product having a solids content at 150° C. of 36.2 percent and a Gardner-Holdt viscosity of T-U.

These organic solvent-thinned and water-thinned nonaminolysis-resistant addition interpolymers were then compared for heat stability to the organic solvent-thinned and water-thinned aminolysis-resistant addition interpolymers of Examples 5–6 as shown in comparative examples (14–17).

The following examples (i.e., 1–6) illustrate the preparation of water-thinnable and organic solvent-thinnable aminolysis-resistant interpolymers of the invention containing pendent carboxyl groups, pendent amine groups and pendent aminolysis-resistant organic groups.

EXAMPLE 1

Into a reactor equipped as in Example A was charged 200.0 grams of dipropylene glycol monoethyl ether and 100.0 grams of propylene glycol monomethyl ether. The contents of the reactor were then heated to 123° C. and a solution consisting of 384.3 grams of isobutyl methacrylate, 164.9 grams of methacrylic acid, 16.5 grams of isooctyl thioglycolate, 31.3 grams of tertiary-butyl peracetate, 40.0 grams of dipropylene glycol monomethyl ether, and 20.0 grams of propylene glycol monomethyl ether was added to the reactor over a 2 hour period and the reaction mixture was then held for 1 hour. (Based on monomer solids, the monomer charge consists of 70 percent isobutyl methacrylate and 30 percent methacrylic acid.) Following the 1 hour hold period, 3.2 grams of tertiary-butyl peracetate, 8.4 grams of dipropylene glycol monomethyl ether and 4.3 grams of propylene glycol monoethyl ether were added over a period of 30 minutes followed by a 1 hour hold. Following this period, 120.0 grams of dipropylene glycol monomethyl ether and 60.0 grams of propylene glycol monomethyl ether were added to the reactor and the contents of the reactor were then cooled. Then 67.2 grams of diethylethanolamine were added followed by cooling. Following this addition, 32.5 grams of propylenimine were added at which point an exotherm was observed. The reaction mixture was then held for 2 hours at temperature. After this period, 67.2 grams of diethylethanolamine were added.

The resultant addition interpolymer had the following properties:

| | |
|---|---|
| Solids Content at 150° C. | 50.8 percent |
| Gardner-Holdt Viscosity | $Z_5$–$Z_6$ |

The above interpolymer is water-thinnable and can also be thinned with an organic solvent such as ethyl Cellosolve.

EXAMPLE 2

Into a reactor equipped as in Example A was charged 305.1 grams of propylene glycol monomethyl ether. The contents of the flask were heated to 120° C. and a solution consisting of 288.6 grams of isobutyl methacrylate, 123.7 grams of methacrylic acid, 12.4 grams of isooctyl thioglycolate, 23.5 grams of tertiary-butyl peracetate and 90.0 grams of propylene glycol monoethyl ether was added over a period of 2 hours. (Based on monomer solids, the monomer charge consists of 70 percent isobutyl methacrylate and 30 percent methacrylate acid.) After the addition was complete, the reaction mixture was held at temperature for 1 hour. Following this hold period, 2.4 grams of tertiary-butyl peracetate and 12.1 grams of propylene glycol monomethyl ether were added over a 30 minute period and the mixture then held at temperature for 1 hour. The reaction mixture was then cooled to 39° C. After cooling was completed, 37.5 grams of hydroxyethyl ethylenimine were added to the contents of the reactor at which time an exotherm was observed. The reaction mixture was permitted to exotherm and the mixture was held at temperature for 3 hours. Following this period, 102.0 grams of diethylethanolamine were added.

The resultant addition interpolymer had the following properties:

| | |
|---|---|
| Solids Content at 150° C. | 54.0 percent |
| Gardner-Holdt Viscosity | $Z_6$ |
| Gardner Color | 3 |

The interpolymer of this example is water-thinnable and can also be thinned with an organic solvent such as ethyl Cellosolve.

EXAMPLE 3

Into a reactor equipped as in Example A was charged 1132.4 grams of propylene glycol monomethyl ether and 1132.4 grams of dipropylene glycol monomethyl ether. The contents of the reactor were heated to about 124° C. and a solution consisting of 2,903.1 grams of isobutyl methacrylate, 1,243.8 grams of methacrylic acid, 124.2 grams of isooctyl thioglycolate, 236.6 grams of tertary butyl peracetate, 226.7 grams of propylene glycol monomethyl ether, and 226.7 grams of dipropylene glycol monomethyl ether was added over a two hour period. (Based on monomer solids, the monomer charge consists of 70 percent isobutyl methacrylate and 30 percent methacrylic acid.) The reaction mixture was then held at temperature for 1 hour. Following the hold period, 24.3 grams of tertiary butyl peracetate, 10.1 grams of propylene glycol monomethyl ether, and 10.1 grams of dipropylene glycol monoethyl ether were added to the reactor over a 30 minute period and the reactor mixture then held for 1 hour at temperature. After the hold period, 678.9 grams of propylene glycol monomethyl ether and 678.9 grams of dipropylene glycol monomethyl ether were added. Following this addition, 395.2 grams of diethylethanolamine were added to the reactor and the reaction mixture was then cooled. After cooling, 186.2 grams of ethylenimine were added and the mixture held for 2 hours. Following this hold period, 790.4 grams of diethylethanolamine were added to the reactor.

The resultant addition interpolymer had the following properties:

| | |
|---|---|
| Solids Content at 150° C. | 52.4 percent |
| Gardner-Holdt Viscosity | $Z_6$–$Z_7$ |
| Gardner Color | 3 |

The interpolymer of this example is water-thinnable and can also be thinned with an organic solvent such as ethyl Cellosolve.

EXAMPLE 4

Into a reactor equipped as in Example A was charged 270.2 grams of propylene glycol monoethyl ether. The contents of the reactor were heated to 120° C. and a mixture consisting of 288.6 grams of cyclohexyl methacrylate, 123.7 grams of methacrylic acid, 12.4 grams of isooctyl thioglycolate, and 23.5 grams of tertiary-butyl peracetate was added over a 2 hour period. The reaction mixture was then held at temperature for 1 hour. (Based on monomer solids, the monomer charge consisted of 70 percent cyclohexyl methacrylate and 30 percent methacrylic acid.) After the hold period, 2.4 grams of tertiary-butyl peracetate and 12.1 grams of propylene glycol monomethyl ether were added to the reactor over a 30 minute period and the mixture then held at temperature for 1 hour. Then, 124 grams of propylene glycol monomethyl ether were added followed by 50.0 grams of diethylethanolamine. The reaction mixture was then cooled to 39° C. After cooling, 24.6 grams of propylenimine were added to the reactor and the reaction mixture then held at temperature for 2 hours. Following this hold period, 67.8 grams of diethylethanolamine were added to the reactor.

The resultant addition interpolymer had the following properties:

| | |
|---|---|
| Solids Content at 150° C. | 51.7 percent |
| Gardner-Holdt Viscosity | $Z_8$ |
| Gardner Color | 5 |

The interpolymer of this example is water-thinnable and can also be thinned with an organic solvent such as ethyl Cellosolve.

EXAMPLES 5–6

These examples illustrate the organic solvent and water-thinnable characteristics of the aminolysis-resistant addition interpolymers of the invention.

In these examples, an aminolysis-resistant addition interpolymer was prepared and one sample of the interpolymer was thinned with an organic solvent (Example 5) and a second sample of the interpolymer was thinned with water (Example 6).

The aminolysis-resistant addition interpolymer was prepared in the following manner:

Into a reactor equipped as in Example A was charged 312.3 grams of ethyl Cellosolve, 312.3 grams of dipropylene glycol monomethyl ether and 15.4 grams of water. The contents of the reactor were heated to reflux (about 125° C.) and a mixture consisting of 821.0 grams of isobutyl methacrylate, 352.0 grams of methacrylic acid, 35.0 grams of isooctyl thioglycolate, 64.0 grams of ethyl Cellosolve, 64.0 grams of dipropylene glycol monomethyl ether and 67.0 grams of tertiary-butyl peracetate was added over a 2 hour period and the reaction mixture held for about 1 hour. (Based on monomer solids, the monomer charge consisted of 70 percent isobutyl methacrylate and 30 percent methacrylic acid.) Following this hold period, 6.9 grams of tertiary-butyl peracetate, 13.0 grams of ethyl Cellosolve and 13.0 grams of dipropylene glycol monomethyl ether were added to the reaction mixture over a period of about 30 minutes. The reaction mixture was then held at temperature for about 1 hour. Then, 182.0 grams of ethyl Cellosolve and 182.0 grams of dipropylene glycol monomethyl ether were added to the reactor while the contents of the reactor was being cooled. While cooling was continuing, 294.0 grams of ethyl Cellosolve was added to the reaction mixture followed by the addition of 146.0 grams of diethylethanolamine. Then with the temperature of the reaction mixture at about 45° C., 68.9 grams of propylenimine were added to the reactor. The reaction mixture was then held at temperature for about 2.3 hours and 143.0 grams of diethylethanolamine and 140.0 grams of water were added to the reactor.

The resultant addition interpolymer had the following properties:

| | |
|---|---|
| Solids Content at 150° C. | 40.3 percent |
| Gardner-Holdt Viscosity | $Z^-$ |
| Gardner Color | 4 |

One sample of the above addition interpolymer was thinned with ethyl Cellosolve to produce an addition interpolymer product having a solids content at 150° C. of 35.6 percent (Example 5).

A second sample of the above addition interpolymer was thinned with water to produce an addition interpolymer product having a solids content at 150° C. of 35.9 percent (Example 6).

These organic solvent-thinned and water-thinned aminolysis-resistant addition interpolymer products were then compared for heat stability to the organic solvent-thinned and water-thinned nonaminolysis-resistant addition interpolymer products of Examples D and E as shown in comparative Examples 14–17.

The following examples (i.e., 7–17) compare the heat stability and aminolysis resistance of addition interpolymers which do not contain pendent aminolysis-resistant organic groups (i.e., the interpolymers of Examples A–E) with the heat stability and aminolysis resistance of addition interpolymers containing pendent aminolysis-resistant organic groups (i.e., the interpolymers of Examples 1–6).

EXAMPLES 7–13

In this comparative evaluation, the heat stability of the interpolymers of Examples A–C and Examples 1–4 were evaluated by placing samples of the interpolymers in a 200° F. oven for 16 hours. After aging, the condition of the interpolymer samples with respect to viscosity changes, gellation and the like was observed. The aminolysis resistance of the interpolymers was determined by running IR Spectra on the interpolymers before and after heating. Comparative tests results are shown in Tables I and II which follow:

TABLE I
(Heat Stability Comparison)

| Comparative Example No. | Interpolymer of Example No. | Heat Aging Conditions | Major Viscosity Increase or Gellation | Minor or No Viscosity Increase |
|---|---|---|---|---|
| 7 | A | 16 hours at 200° F. | X | |
| 8 | B | 16 hours at 200° F. | X | |
| 9 | C | 16 hours at 200° F. | X | |
| 10 | 1 | 16 hours at 200° F. | | X |
| 11 | 2 | 16 hours at 200° F. | | X |
| 12 | 3 | 16 hours at 200° F. | | X |
| 13 | 4 | 16 hours at 200° F. | | X |

Table II
(Aminolysis Resistance)

| Comparative Example No. | Interpolymer of Example No. | IR Spectra Before Heating | IR Spectra After Heating | Amide Formation |
|---|---|---|---|---|
| 7 | A | Peak at 1753 (carbonyl) | Peaks at 1733 and 1653 | Yes |
| 8 | B | Peak at 1730 (carbonyl) | Peaks at 1730 and 1670 | Yes |
| 9 | C | Peak at 1734 (carbonyl) | Peaks at 1730 and 1673 | Yes |
| 10 | 1 | Peak at 1730 (carbonyl) | Peak at 1730 | No |
| 11 | 2 | Peak at 1730 (carbonyl) | Peak at 1730 | No |
| 12 | 3 | Peak at 1730 (carbonyl) | Peak at 1730 | No |
| 13 | 4 | Peak at 1728 (carbonyl) | Peak at 1726 | No |

As the above data illustrates, the interpolymers of Examples A–C after heat aging show either large increases in viscosity or gellation and undergo aminolysis (i.e., amides are formed) whereas the interpolymers of Examples 1–4 show either no change or only minor viscosity increases and do not undergo aminolysis.

EXAMPLES 14–17

In this comparative evaluation, the heat stability of the organic solvent-thinned and water-thinned addition interpolymers of Examples D and E (comparative Examples 14 and 15) and Examples 5 and 6 (comparative Examples 16 and 17) were evaluated by placing samples of these interpolymers in a 200° F. oven and permitting them to heat age overnight (i.e., approximately 16 hours). After this period of aging, the condition of the interpolymer samples was observed. In this evaluation, the interpolymers of Examples 14 and 15 were found to have undergone gellation while those of Examples 16 and 17 did not gel.

This evaluation again illustrates that the addition interpolymers of the invention have improved stability particularly at elevated temperatures.

EXAMPLE 18

Into a reactor equipped as in Example 1 was charged 2624.0 grams of propylene glycol monomethyl ether. The contents of the reactor were heated to 118° C. and a mixture consisting of 3365.7 grams of isobutyl methacrylate, 1442.3 grams of methacrylic acid, 144.3 grams of isooctyl thioglycolate, 273.8 grams of tertiary-butyl peracetate and 524.8 grams of propylene glycol monomethyl ether was added over a 2 hour period (based on monomer solids, the charge contains 70 percent isobutyl methacrylate and 30 percent methacrylic acid). Then 28.0 grams of tertiary-butyl peracetate and 23.6 grams of propylene glycol monomethyl ether were added over a 30 minute period. Following this addition, 1573.5 grams of propylene glycol monomethyl ether were added to the reactor over a 30 minute period. The resultant addition interpolymer solution had a solids content measured at 150° C. of 52.3 percent, a Gardner-Holdt viscosity of Z2–Z3 and a Gardner color of 1.

To a 2 liter flask equipped with stirrer and thermometer were charged 1000.0 grams of the above addition interpolymer solution and 29.0 grams of propylenimine. The contents of the flask were held for 2 hours with stirring. Following this period, 94.1 grams of pyridine were added to the flask. The resultant addition interpolymer salt had a solids content as measured at 150° C. of 49.8 percent. The interpolymer of this example is water-thinnable and can also be thinned with an organic solvent.

EXAMPLE 19

Into a reactor equipped as in Example 1 was charged 2624.0 grams of propylene glycol monomethyl ether. The contents of the reactor were heated to 118° C. and a mixture consisting of 3365.7 grams of isobutyl methacrylate, 1442.3 grams of methacrylic acid, 144.3 grams of isooctyl thioglycolate, 273.8 grams of tertiary-butyl peracetate and 524.8 grams of propylene glycol monomethyl ether was added over a 2 hour period (based on monomer solids, the charge contains 70 percent isobutyl methacrylate and 30 percent methacrylic acid). Then 28.0 grams of tertiary-butyl peracetate and 23.6 grams of propylene glycol monomethyl ether were added over a 30 minute period. Following this addition, 1573.5 grams of propylene glycol monomethyl ether were added to the reactor over a 30 minute period. The resultant addition interpolymer solution had a solids content measured at 150° C. of 52.3 percent, a Gardner-Holdt viscosity of Z2–Z3 and a Gardner color of 1.

Into a 2 liter flask was charged 1000 grams of the above addition interpolymer solution and 29.0 grams of propylenimine. The contents of the flask were then held for two hours with stirring. Following this period, 121.0 grams of N-methyl morpholine were added to the flask with stirring. The resultant addition interpolymer salt had a solids content as measured at 150° C. of 51.2 percent, a Gardner-Holdt viscosity of Z-10 and a Gardner color of 2. The addition interpolymer of this example is water-thinnable and can also be thinned with an organic solvent.

EXAMPLE 20

In this example, Example 1 was substantially repeated except that the addition interpolymer was neutralized with potassium hydroxide instead of diethylethanolamine. The resultant addition interpolymer salt had a solids content at 105° C. of 60.4 percent, a Gardner-Holdt viscosity of Z4–Z5 and a Gardner color of 3. The addition interpolymer of this example is water-thinnable and can also be thinned with an organic solvent.

The following examples (21–23) illustrate the use of aminolysis-resistant addition interpolymers in compositions containing polyepoxide resins.

EXAMPLE 21

In this example, 20.0 grams of the addition interpolymer solution of Example 4 (prepared from monomer charged consisting of 70 percent cyclohexyl methacrylate and 30 percent methacrylic acid) was blended with 10.34 grams of Epon 828, a polyepoxide resin of epichlorohydrin-Bisphenol A having an epoxide equivalent of 185–192 and a viscosity as measured by ASTM D-445 of 100–160 passes, available from Shell Chemical Company.

The resultant composition was drawn down on a metal panel using a 3-mil Bird Bar. The coated panel was then permitted to air dry at ambient temperature for 24 hours and then was placed in a 140° F. oven for an additional 24 hours.

The cure and solvent resistance of the coating were evaluated utilizing the well-known acetone resistance test in which a cloth impregnated with acetone is rubbed across the surface of the film and the number of rubs needed to remove the film from the substrate is reported. The coating of this example resisted over 100 acetone rubs without any film loss or softening, indicating excellent cure and solvent resistance.

EXAMPLE 22

A coating composition was prepared by blending the following ingredients:

|  | Parts by weight |
|---|---|
| Addition interpolymer solution of Example 18 | 690.0 |
| Epon 834* | 355.0 |
| TiO$_2$ | 500.0 |
| Silica (amorphous) | 200.0 |
| Propylene glycol monomethyl ether | 88.0 |
| Dipropylene glycol monomethyl ether | 90.0 |
| Igepal C0897** | 30.0 |
| H$_2$O | 264.0 |

EXAMPLE 23

A coating composition was prepared by blending the following ingredients:

|  | Parts by weight |
|---|---|
| Addition interpolymer solution of Example 19 | 690.0 |
| Epon 834 | 355.0 |
| TiO$_2$ | 500.0 |
| Silica (amorphous) | 200.0 |
| Propylene glycol monomethyl ether | 88.0 |
| Dipropylene glycol monomethyl ether | 90.0 |
| Igepal C0897 | 30.0 |
| H$_2$O | 264.0 |

EXAMPLES 24–31

These examples illustrate the effect of various methacrylate esters on the aminolysis-resistance of iminated interpolymers. In these examples, a series of iminated interpolymers were prepared having essentially the same composition except for the type methacrylate ester employed. Thus, a series of iminated interpolymers were prepared from monomer ratios consisting of 70 percent methacrylate ester and 30 percent methacrylic acid using basically the same procedures as employed in Examples 1–6. The resultant iminated interpolymers were then tested for heat stability by first obtaining an initial room temperature viscosity and then placing samples of each interpolymer in a 200° F. for 16 hours and measuring the changes in viscosity. Test results are shown in Table III.

TABLE III

| Ex. No. | Methacrylate Ester | Initial Viscosity Gardner Holdt | Poise | Final Viscosity after 16 hrs., 200° F. Gardner Holdt | Poise | Change in Poise |
|---|---|---|---|---|---|---|
| 24 | methyl methacrylate | Z5— | 80 | Gel | Gel | — |
| 25 | ethyl methacrylate | Z2 | 36 | Z4–Z5 | 78 | 42 |
| 26 | propyl methacrylate | Y | 18 | Z1–Z2 | 32 | 14 |
| 27 | isopropyl methacrylate | Z4 | 63 | Z5 | 98 | 35 |
| 28 | butyl methacrylate | Z1+ | 30 | Z3+ | 53 | 23 |
| 29 | isobutyl methacrylate | Z+ | 24 | Z2— | 34 | 10 |
| 30 | 80% isobutyl methacrylate 20% methyl methacrylate | Z2— | 34 | Z3–Z4 | 55 | 21 |
| 31 | 60% isobutyl meth- | Z6— | 128 | Z7 | 370 | 242 |

TABLE III-continued

| Ex. No. | Methacrylate Ester | Initial Viscosity Gardner Holdt | Poise | Final Viscosity after 16 hrs., 200° F. Gardner Holdt | Poise | Change in Poise |
|---------|--------------------|-----|-------|-----|-------|-----|
| | acrylate 40% methyl methacrylate | | | | | |

According to the provisions of the Patent Statues, there are described above the invention and what are now considered to be its best embodiments. However, within the scope of the appended claims, it is to be understood that the invention can be practiced otherwise than as specifically described.

We claim:

1. A water thinnable or reducible addition interpolymer having improved stability containing pendent anionic salt groups, pendent carboxyl groups, pendent amine groups and pendent aminolysis-resistant organic groups, wherein said interpolymer is prepared by interpolymerizing from about 5 percent to about 60 percent by weight of at least one ethylenically-unsaturated carboxylic acid monomer and from about 40 percent to about 95 percent by weight of a branched chain or alicyclic ester of an alpha, alkyl-substituted carboxylic acid so as to form an interpolymer having pendent carboxyl groups and pendent aminolysis-resistant organic groups and wherein said interpolymer is further reacted with sufficient alkylenimine to iminate from about 5 mole percent to about 95 mole percent of the carboxyl groups to form the pendent amine groups and sufficient base to form the pendent anionic salt groups and to result in a level of neutralization sufficient to give the interpolymer a pH of greater than 7.0 in water.

2. The addition interpolymer of claim 1 wherein the branched chain or alicyclic ester of the alpha, alkyl-substituted carboxylic acid is selected from the group consisting of isobutyl methacrylate, tertiary butyl methacrylate, isobornyl methacrylate, cyclohexyl methacrylate, and mixtures thereof.

3. The addition interpolymer of claim 2 wherein said carboxylic acid is acrylic acid or methacrylic acid or a mixture thereof.

4. The addition interpolymer of claim 3 wherein said alkylenimine is propylenimine or ethylenimine or a mixture thereof.

5. The addition interpolymer of claim 3 or 1 wherein said interpolymer is prepared by interpolymerizing from about 10% to about 50% by weight of the ethylenically unsaturated carboxylic acid monomer and from about 50% to about 90% by weight of the aminolysis-resistant organic monomer.

6. The addition interpolymer of claim 5 wherein said branched chain or alicyclic ester is isobutyl methacrylate.

7. The addition interpolymer of claim 3 wherein said pendent anionic salt groups are derived by neutralizing carboxyl groups with an amine or an alkali metal hydroxide.

8. The addition interpolymer of claim 7 wherein said carboxyl groups are neutralized with dimethylethanolamine.

* * * * *